3,468,646
PROCESS FOR PRODUCING REFLECTIVE COLORED GLASS SURFACE
John B. Finn and Carl J. Hudecek, Toledo, Ohio, assignors to Owens-Illinois, Inc., a corporation of Ohio
No Drawing. Filed Sept. 30, 1966, Ser. No. 583,437
Int. Cl. C03c 19/00, 23/00; C03b 29/00
U.S. Cl. 65—30                                    10 Claims

ABSTRACT OF THE DISCLOSURE

A method for producing a highly reflective mirror-like colored surface on a copper glass article wherein the surface of the article is first polished and is then subjected to a temperature within the range of 400°–800° F. in an oxidizing atmosphere for a period of time sufficient to produce the desired colored reflective surface. The resulting color of the surface will vary with the temperature and the period of time.

---

The present invention relates to surfaces and more particularly, the invention pertains to highly reflective surfaces on shaped glass bodies. Specifically, the instant invention pertains to a novel process for producing highly reflective colored surfaces on copper glasses.

Previously, the most common methods of producing a reflective surface on a glass substrate consisted in applying a superficial metal-like layer onto the glass substrate or by casing one glass with another entirely different glass. The above procedures generally presented difficulties, such as, difficulty in annealing because the different glasses used had different annealing properties, the lack of adhesion of the metal-like layer to the glass substrate, and, the general mismatch of the desired reflective surface in respect to the glass substrate.

It will be appreciated by those versed in the art that if reflective surfaces are produced that are not subject to the above stated difficulties, such as physical mismatch, lack of adhesion etc., said novel reflective surfaces would substantially improve the usefulness of the reflective glass article. Also, it will be further appreciated by those versed in the art that is novel, varicolored reflective surfaces are produced from a single glass composition, said surfaces would make a valuable contribution to the instant art and would also have a positive value in science and commerce.

Accordingly, it is an object of this invention to provide a novel article of manufacture.

A further object of the present invention is to provide from a single glass an article having a reflective surface, whose reflectivity is stable for an extended period.

Still a further object of the invention is to produce varicolored surfaces on a glass composition.

Yet a further object is to provide a means for producing a reflective surface on a glass body.

Yet a still further object is to provide an improved an economical method of producing adherent stable reflective, colored surfaces on glass substances.

These, and other objects of the invention will become readily apparent to one skilled in the subject art from the following detailed description and claims.

In attaining the objects of this invention it has now been found that a highly reflective mirror like surface can be produced on a glass substrate by polishing and oxidizing a glass substrate that contains cupric or cuprous oxide. The many colored glass surfaces of the instant invention can also be obtained by polishing and oxidizing said copper rich substrate glass.

Exemplary of glasses employed for the purpose of the present invention are glass compositions containing copper and other glass forming components such as $SiO_2$, $Al_2O_3$, $Fe_2O_3$, $TiO_2$, NiO, CoO and $AlF_3$. The glasses generally consist of 50 to 94 mole percent $SiO_2$, 0.5 to 30 mole percent $Al_2O_3$ and 1.5 to 35 mole percent $Cu_2O$; a glass containing 50 to 94 mole percent $SiO_2$, 0.5 to 30 mole percent $Al_2O_3$, 1.5 to 35 mole percent $Cu_2O$, 0 to 11 mole percent $TiO_2$, 0 to 6 mole percent $Fe_2O_3$ 0 to 6 mole percent NiO, 0 to 6 mole percent CoO and 0 to 6 mole percent $AlF_3$; a glass containing 58 to 83 mole percent $SiO_2$, 4 to 20 mole percent $Al_2O_3$, 10 to 20 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 mole percent $AlF_3$; and a glass containing 58 to 83 mole percent $SiO_2$, 4 to 20 mole percent $Al_2O_3$, 10 to 15 mole percent $Cu_2O$, and a member selected from the group consisting of $TiO_2$, CoO, NiO, $Fe_2O_3$ and $AlF_3$ and mixtures thereof; and a glass composition containing 74.5 to 88 mole percent $SiO_2$, 2.5 to 10 mole percent $Al_2O_3$ 7.5 to 12.5 mole percent $Cu_2O$ and at least one of 1 to 6 mole percent $TiO_2$, $Fe_2O_3$, NiO, $AlF_3$ or CoO.

The glasses employed herein can be prepared by blending the necessary batch ingredients, melting and heating to such temperature so that all of the glass forming ingredients are present in a liquid state to enable the formation of a glass from a homogeneous melt. The glasses are usually prepared by mixing and then melting in a 90% platinum —10% rhodium crucible or a fused silica crucible. The size of the melt was usually between 2000 grams and 5500 grams, or larger, and the melting temperature was about 2700° C. to 3100° C., for a time of about 20 to 30 hours. The melting was carried out in an electric heated furnace, although other equivalent heating means could be successfully utilized.

The glasses used herein were prepared from commercially available reagents, for example, Kona Quintus Quartz, Alcoa A–14 Alumina, CuO, $Cu_2O$, $TiO_2$, NiO, $Fe_2O_3$, $AlF_3$, Hi-Calumet Cupric and the like.

Exemplary of a glass used for the purpose of the present invention is a glass characterized by a theoretical composition consisting essentially of 77.5 mole percent $SiO_2$, 10.0 mole percent $Al_2O_3$ and 12.5 mole percent $Cu_2O$, with an annealing point of 629° C., and unannealed density of 2.732 and a thermal coefficient of expansion of $3.2 \times 10^{-7}$/C. (0–300° C.). The immediate glass was prepared by intimately mixing 3745 grams of Kona Quintus Quartz, 822.8 grams of A–14 Alumina and 1493 grams of 96.3% cuprous oxide, and melting the mixed batch in a fused silica crucible at 2950° F., for about 24 hours under a 0.5% oxygen atmosphere. Other glass compositions were prepared as follows: a glass was prepared by melting a batch containing 3193 grams of Kona Quintus Quartz, 700 grams of A–14 Alumina, 1018 grams of $Cu_2O$ and 130.2 grams of NiO, for 24 hours and 40 minutes at 2950° F., to effect a glass having a theoretical composition of 77.5 mole percent $SiO_2$, 10.0 mole percent $Al_2O_3$, 10.0 mole percent $Cu_2O$ and 2.5 mole percent NiO; a glass prepared by intimately blending and melting, at 2920° F. for 24 hours and 30 minutes, a batch containing 3121 grams of Kona Quintus Quartz, 686 grams of A–14 Alumina and 1330 grams of Hi-Cupric Calumet to give a glass with the theoretical composition of 77.5 mole percent $SiO_2$, 10.0 mole percent $Al_2O_3$, and 12.5 mole percent $Cu_2O$, which glass had an unannealed density of 2.7020, an annealing point of 601° C., and a coefficient of expansion of $4.1 \times 10^{-7}$/C. (0–300° C.); a glass consisting essentially of 75.0 mole percent $SiO_2$, 10.0 mole percent $Al_2O_3$, 12.5 mole percent $SiO_2$, 10.0 mole percent $Al_2O_3$, 12.5 mole percent $Cu_2O$ and 2.5 mole percent $Fe_2O_3$, was prepared from a batch containing 2922 grams of Kona Quintus Quartz, 622 grams of A-14 Alumina, 1204 grams of Cuprous oxide and 259.6 grams of $Fe_2O_3$, by melting said batch for 24 hours in a 0.5% oxygen atmosphere; a glass composition consisting of 73 mole percent $SiO_2$, 12.5 mole percent $Al_2O_3$, 12.5 mole percent $Cu_2O$ and 2.0 mole percent $TiO_2$ was prepared by intimately blending and then melting at 2950° F. for 24 hours in a 0.5% oxygen atmosphere a batch containing 2883 grams of Kona Quintus Quartz, 840 grams of A-14 Alumina, 1220 grams of $Cu_2O$ and 106 grams of Titanox ($TiO_2$); and a glass having a theoretical composition of 77 mole percent $SiO_2$, 9.25 percent $Al_2O_3$, 12.4 mole percent and 1.3 mole percent aluminum fluoride prepared from 3119 grams of Kona Quintus Quartz, 589 grams of A-14 Alumina, 1329 grams of Hi-Calumet Cupric and 74 grams of aluminum fluoride. Other glasses as well as utility and discussion of said glasses are set forth in U.S. application S.N. 465,381 now abandoned, and in U.S. application S.N. 552,992, the disclosures of which are incorporated herein by reference.

The color and reflectivity was produced on the subject glasses by first polishing the glass surface and then oxidizing the freshly polished surface in an air or oxygen atmosphere. The samples were generally oxidized in the temperature interval of 600° to 800° F. for 6 to 15 minutes. Other samples were prepared wherein the glasses were oxidized in the temperature range of 450° to 600° F., with a good working range of about 500° F., for a time period of the order of ¼ to 3 hours, usually about 1 to 3 hours.

Exemplary of the polishing agents that can be used for the purpose of the present invention are ground cerium oxide, ground pumice, mixtures of cerium oxide and pumice, the silicates of aluminum, sodium and potassium, combinations of cerium oxide with barium carbonate and barium hydroxide, a suspension of finely pulverized silica, jeweler's rouge and like known polishing agents that can be used for preparing mirrors, lenses, scientific apparatus or reflective surfaces. The polishing agents are generally used mixed with a liquid, in solution, slurry or emulsion form, and they can also contain solvents for quick evaporation.

The following examples are merely illustrative of the mode and manner of the invention and are not to be construed as limiting as these and other formulations will be evident from the examples as set forth herein.

A highly reflective mirror like surface was obtained on the surface of a piece of glass by polishing the glass with a felted polishing wheel and a slurry of cerium oxide and water. The glass composition consist essentially of 77.5 mole percent $SiO_2$, 10 mole percent $Al_2O_3$ and 12.5 mole percent $Cu_2O$. The polished glass was then oxidized in air at 650° F. for 15 minutes.

In Table 1, immediately below, samples of glass were polished and oxidized in static air atmospheres in a temperature of 600° F. to 800° F. for 6 to 15 minutes. The glass consist of 77.5 mole percent $SiO_2$, 10 mole percent $Al_2O_3$ and 12.5 mole percent $Cu_2O$. The color and the degree of reflectivity are reported in the table as a time-temperature factor. The reflectivity is reported as "F," "G" or "P" for fair, good or poor.

TABLE 1.—EFFECTS OF POLISHING AND AIR OXIDATION

| Temperature, °F. | Time, minutes | Color | Reflectivity |
|---|---|---|---|
| 600 | 6 | Purple | P |
| 650 | 6 | Silver-light-blue | G |
| 700 | 6 | Silver-faint-blue | G |
| 750 | 6 | Silver-gold | G |
| 800 | 6 | Silver-violet | F |
| 600 | 15 | Silver-dark-blue | F |
| 650 | 15 | Silver | G |
| 700 | 15 | Silver-gold | G |
| 750 | 15 | Silver-blue | G |
| 800 | 15 | Silver-gold-purple | G |

In Table 2, immediately below, samples of glass were first polished and then oxidized in 20 cubic feet per hour (c.f.h.) laminar air flow in a temperature interval of 600° F. to 800° F. for 6 to 15 minutes. The glass consists of 77.5 mole percent $SiO_2$, 10 mole percent $Al_2O_3$ and 12.5 mole percent $Cu_2O$. The color produced and the degree of reflectivity are reported in the table as a function of time and temperature, and the observed reflectivity is reported fair (F), poor (P), or good (G).

TABLE 2.—EFFECTS OF POLISHING AND FORCE AIR OXIDATION

| Temperature, °F. | Time, minutes | Color | Reflectivity |
|---|---|---|---|
| 600 | 6 | Silver-purple | F |
| 650 | 6 | Silver-light-blue | G |
| 700 | 6 | Silver-light-gold | G |
| 750 | 6 | Silver-violet-gold | G |
| 800 | 6 | Silver-gold-blue | G |
| 600 | 15 | Silver-light-blue | G |
| 650 | 15 | Silver-light-gold | G |
| 700 | 15 | Silver-blue | F |
| 750 | 15 | Silver-violet-gold | F |

An unoxidized and non-polished sample of the above glass as used in Tables 1 and 2 has a black appearance, while a polished only sample was still black but had very slight reflectivity. A sample of the glass that was oxidized, but not polished surface appeared a very dull silver color.

A highly reflective mirror like surface was produced on a glass composition consisting of 77 mole percent $SiO_2$, 9.25 mole percent $Al_2O_3$, 12.45 mole percent $Cu_2O$ and 1.30 mole percent $AlF_3$ by polishing and oxidizing the glass in an air atmosphere. Various samples of the immediate glass were oxidized for 1 to 3 hours at a temperature of 450° to 600° F. The degree of reflectivity and the color produced were similar to the results set forth in Tables 1 and 2 supra.

A highly reflective mirror like surface was produced on a glass having a theoretical composition of 77 mole percent $SiO_2$, 9.25 mole percent $Al_2O_3$, 12.45 mole percent $Cu_2O$ and 1.30 mole percent $AlF_3$ by treating the surface as above described, except that a forced air current was used during the heat treatment. The samples were treated for about ¼ hour to 3 hours at 450 to 600° F. The process produced a reflective and multi-colored glass surface.

The finished product, that is, glasses polished and oxidized, can be used in the fields of science and commerce as front surface mirrors for lasers, spectrometers or telescopes, for conventional mirrors and the like.

We claim:

1. The method of producing at least one colored, reflective and stable adherent mirror-like surface on a glass substrate consisting essentially of 50 to 94 mole percent $SiO_2$, 0.5 to 30 mole percent $Al_2O_3$, 1.5 to 35 mole percent $Cu_2O$, 0 to 6 mole percent $Fe_2O_3$, 0 to 11 mole percent $TiO_2$ and 0 to 6 mole percent $NiO_2$, 0 to 6 mole percent $CoO$ and 0 to 6 mole percent $AlF_3$ wherein said method consists essentially of the steps of polishing said surface and then subjecting the polished surface to a temperature of 400° to 800° F. in an oxidizing atmosphere for a period of time sufficient to produce said colored, reflective mirror-like surface.

2. The method according to claim 1 wherein the oxidizing atmosphere is an air atmosphere.

3. The method according to claim 1 wherein the oxidizing atmosphere is a forced moving air atmosphere.

4. The method according to claim 1 wherein the glass substrate consists essentially of 58 to 83 mole percent $SiO_2$, 4 to 20 mole percent $Al_2O_3$ and 10 to 20 mole percent $Cu_2O$.

5. The method according to claim 4 wherein said glass substrate consists of 10 to 15 mole percent $Cu_2O$.

6. The method according to claim 1 wherein said polished surface is subjected to said temperature for a period of from about 6 to about 15 minutes.

7. The method according to claim 1 wherein said glass substrate contains 74.5 to 88 mole percent $SiO_2$, 2.5 to 10 mole percent $Al_2O_3$ and 7.5 to 12.5 mole percent $Cu_2O$.

8. The method according to claim 1 wherein said polished surface is subjected to said temperature for a period of up to 3 hours.

9. The method according to claim 1 wherein the temperature is from 450° to 600° F.

10. The method according to claim 1 wherein the temperature is from 600° to 800° F.

References Cited

UNITED STATES PATENTS

| | | | |
|---|---|---|---|
| 3,014,815 | 12/1961 | Lely et al. | 65—32 XR |
| 3,087,831 | 4/1963 | Browne | 117—35 |
| 3,182,376 | 5/1965 | Sprague et al. | 65—18 XR |
| 3,231,456 | 1/1966 | McMillan et al. | 65—33 XR |
| 3,380,817 | 4/1966 | Gardner | 65—3 |

S. LEON BASHORE, Primary Examiner

J. H. HARMON, Assistant Examiner

U.S. Cl. X.R.

65—31, 60; 106—52; 117—124.35